United States Patent Office 3,777,024
Patented Dec. 4, 1973

3,777,024
SYNERGISTICALLY ACTIVATED BIOCIDAL
COMPOSITIONS
Henry Martin and Volker Dittrich, Basel, Switzerland, Georg Pissiotas, Loerrach, Germany, and Otto Rohr, Therivil, Switzerland, assignors to Ciba-Geigy AG, Basel, Switzerland
No Drawing. Filed Jan. 5, 1971, Ser. No. 104,143
Claims priority, application Switzerland, Jan. 8, 1970, 205/70
Int. Cl. A01n 9/36
U.S. Cl. 424—200    13 Claims

ABSTRACT OF THE DISCLOSURE

Arylpropargyl-ethers and arylpropargyl-thioethers of the formula

Aryl—X—CH$_2$—C≡C—R$_1$ in which X represents an oxygen or a sulphur atom, and R$_1$ represents a hydrogen atom, a halogen atom, an alkyl group having from 1 to 7 carbon atoms or an unsubstituted or substituted aromatic hydrocarbon radical, as synergistic agents to biocidally active compounds other than carbamic acid derivatives.

---

This invention relates to compositions which contain biocidally active compounds other than carbamic acid derivatives and, as synergistic agents, arylpropargyl-ethers and aryl-propargyl-thioethers.

The present invention provides a composition comprising a biocidally active compound and, as synergistic agent, a compounds of Aryl—X—CH$_2$—C≡C—R$_1$ in which X represents an oxygen or a sulphur atom, and R$_1$ represents a hydrogen atom, a halogen atom, an alkyl group having from 1 to 7 carbon atoms or an unsubstituted or substituted aromatic hydrocarbon radical.

Possible aromatic hydrocarbon radicals are mononuclear or polynuclear, condensed or fused ring systems, for example, the phenyl, naphthyl, dihydronaphthyl and tetrahydronaphthyl, anthryl, phenanthryl, indenyl and fluorenyl radicals, which can optionally be substituted by halogen atoms or alkyl groups having from 1 to 7 carbon atoms, alkoxy having from 1 to 7 carbon atoms, aryl, aryloxy, methylenedioxy, aralkyl, aralkoxy, nitro, nitrile, carboxyl, carboalkoxy, acylamino or alkylimido groups. The term halogen denotes fluorine, chlorine, bromine or iodine atoms. The alkyl radicals having from 1 to 7 carbon atoms can be branched or straight-chain.

Examples of preferred alkyl radicals are: methyl, ethyl, propyl, isopropyl, n-, i-, sec.- or tert.-butyl, n-pentyl, n-hexyl or n-heptyl.

Compounds of the formulae

and

    (II)

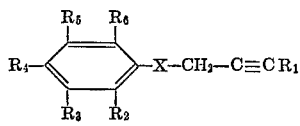

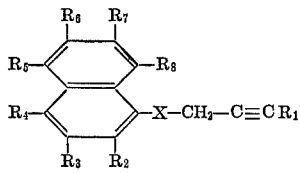    (III)

in which X and R$_1$ have the meaning given above and R$_2$ to R$_8$ each represents a hydrogen or halogen atom or an alkyl group having from 1 to 7 carbon atoms, an alkoxy group having from 1 to 7 carbon atoms, a methylenedioxy group or a nitro group, are preferred.

As examples of suitable compounds of the Formulae II and III there may be mentioned, inter alia,

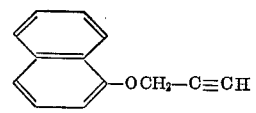

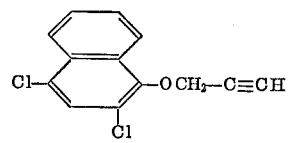

and

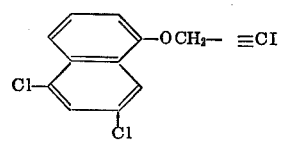

The propargyl compounds of the Formula I can be manufactured according to the methods which are in themselves known, for example (a) by reacting an aromatic compound of the formula aryl—hal with a propargyl compound of the formula

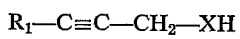
R$_1$—C≡C—CH$_2$—XH or (b) by reacting an aromatic compound of the formula aryl—XH with a propargyl halide of the formula

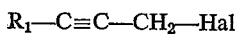
R$_1$—C≡C—CH$_2$—Hal in which aryl, R$_1$ and X have the meanings given above and Hal represents a fluorine, bromine or iodine atom, or, preferably, a chlorine atom.

The compounds of the Formula I possess a biocidal action and can be employed for combating both plant and animal pests. It has surprisingly been found that the compounds of the Formula I impart to the incesticidal and/or acaricidal compounds which are suitable according to the invention, an increase in acivity (synergism) which clearly exceeds the expected, additive effect.

Possible suitable representatives of insecticidal and/or acaricidal compounds are, for example, the following:

PHOSPHORIC ACID DERIVATIVES

Bis-O,O-diethylphosphoric acid anhydride (TEPP)
O,O,O,O-tetrapropyldithiopyrophosphate
Dimethyl(2,2,2-trichloro-1-hydroxyethyl)phosphonate (trichlorfon)
1,2-dibromo-2,2,-dichloroethyldimethylphosphate (naled)
2,2-dichlorovinyldimethylphosphonate (dichlorfos)
2-methoxycarbamyl-1-methylvinylidimethylphosphate (mevinphos)
Dimethyl-1-methyl-2-(methylcarbamoyl)vinylphosphate cis (monocrotophos)
3-(dimethoxyphosphinyloxy)-N-methyl-N-methoxy-cis-crotonamide
3-(dimethoxyphosphinyloxy)-N,N-dimethyl-cis-crotonamide (dicrotophos)
2-chloro-2-diethylcarbamoyl-1-methylvinyldimethyl-phosphate (phosphamidon)
O,O-diethyl-O(or S)-2-(ethylthio)-ethylthiophosphate (demeton)
S-ethylthioethyl-O,O-dimethyl-dithiophosphate (thiometon)
O,O-diethyl-S-ethylmercaptomethyldithiophosphate (phorate)
O,O-diethyl-S-2-[(ethylthio)ethyl]dithiophosphate (disulfoton)

O,O-dimethyl-S-2-(ethylsulphinyl)ethylthiophosphate (oxydemetonmethyl)
O,O-dimethyl-S-(1,2-dicarbethoxyethyl)dithiophosphate (malathion)
(O,O,O,O-tetraethyl-S,S'-methylene-bis-[dithiophosphate]) (ethion)
O-ethyl-S,S-dipropyldithiophosphate
O,O-dimethyl-S-(N-methyl-N-formylcarbamoylmethyl)-dithiophosphate (formotion)
O,O-dimethyl-S-(N-methylcarbamoylmethyl)dithiophosphate (dimethoate)
O,O-dimethyl-S-(N-ethylcarbamoylmethyl)dithiophosphate (ethoat-methyl)
O,O-diethyl-S-(N-isopropylcarbamoylmethyl)-dithiophosphate (prothoat)
S-N-(1-cyano-1-methylethyl)carbamoylmethyldiethyl-thiolphosphate (cyanthoate)
S-(2-acetamidoethyl)-O,O-dimethyldithiophosphate
Hexamethylphosphoric acid triamide (HEMPA)
O,O-dimethyl-O-p-nitrophenylthiophosphate (parathion-methyl)
O,O-diethyl-O-p-nitrophenylthiophosphate (parathion)
O-ethyl-O-p-nitrophenylphenylthiophosphonate (EPN)
O,O-dimethyl-O-(4-nitro-m-tolyl)-thiophosphate (fenithrothion)
O,O-dimethyl-O-(2-chloro-4-nitrophenyl)thiophosphate (dicapthon)
O,O-dimethyl-O-p-cyanophenylthiophosphate (cyanox)
O-ethyl-O-p-cyanophenylphenylthiophosphonate
O,O-diethyl-O-2,4-dichlorophenylthiophosphate (dichrofenthion)
O-2,4-dichlorophenyl-O-methylisopropylamidothiophosphate
O,O-dimethyl-O-2,4,5-trichlorophenylthiophosphate (ronnel)
O-ethyl-O-2,4,5-trichlorophenylethylthiopshosphonate (trichloronate)
O,O-dimethyl-O-2,5-dichloro-4-bromophenylthiophosphate (bromophos)
O,O-diethyl-O-2,5-dichloro-4-bromophenylthiophosphate (bromophos-ethyl)
O,O-dimethyl-O-(2,5-dichloro-4-iodophenyl)-thiophosphate (iodofenphos)
4-tert.butyl-2-chlorophenyl-N-methyl-O-methylamidophosphate (cruformat)
Dimethyl-p-(methylthio)phenylphosphate
O,O-dimethyl-O-(3-methyl-4-methylmercaptophenyl)thiophosphate (fenthion)
Isopropylamino-O-ethyl-O-(4-methylmercapto-3-methylphenyl)phosphate
O,O-diethyl-O-p-[(methylsulphinyl)phenyl]-thiophosphate (fensulfothion)
O,O-dimethyl-O-p-sulphamidophenylthiophosphate
O-[p-(dimethylsulphamido)phenyl]-O,O-dimethylthiophosphate (famphur)
O,O,O',O'-tetramethyl-O,O'-thiodi-p-phenylenethiophosphate
O-(p-(p-chlorophenylazophenyl))-O,O-dimethylthiophosphate (azothoat)
O-ethyl-S-phenyl-ethyldithiophosphonate
O-ethyl-S-4-chlorophenyl-ethyldithiophosphonate
O-isobutyl-S-p-chlorophenyl-ethyldithiophosphonate
O,O-dimethyl-S-p-chlorophenylthiophosphate
O,O-dimethyl-S-(p-chlorophenylthiomethyl)-dithiophosphate
O,O-diethyl-p-chlorophenylmercaptomethyl-dithiophosphate (carbophenothion)
O,O-diethyl-S-p-chlorophenylthiomethyl-thiophosphate
O,O-dimethyl-S-(carboethoxy-phenylmethyl)dithiophosphate (phenothoate)
O,O-diethyl-S-(carbofluorethoxy-phenylmethyl)-dithiophosphate
O,O-dimethyl-S-(carboisopropoxy-phenylmethyl)-dithiophosphate O,O-dimethyl-O-(alpha-methylbenzyl-3-hydroxycrotonyl)phosphate,
2-chloro-1-(2,4-dichlorophenyl)vinyl-diethylphosphate (chlorfenvinphos)
2-chloro-1-(2,4,5-trichlorophenyl)vinyl-dimethylphosphate
O-(2-chloro-1-(2,5-dichlorophenyl)vinyl-O,O-diethylthiophosphate
Phenylglyoxylonitriloxime-O,O-diethylthiophosphate (phoxim)
O,O-diethyl-O-(3-chloro-4-methyl-2-oxo-2-H-1-benzopyran-7-yl)-thiophosphate (coumaphos)
O,O-diethyl-7-hydroxy-3,4-tetramethylene-coumarinyl-thiophosphate (coumithoate)
2,3-p-dioxanedithiol-S,S-bis(O,O-diethyldithiophosphate) (dioxathion)
2-methoxy-4-H-1,3,2-benzodioxaphosphorine-2-sulphide
O,O-diethyl-O-(5-phenyl-3-isooxyzolyl (sic)) thiophosphate
S-[(6-chloro-2-oxo-3-benzoxazolinyl)methyl]-O,O-diethyldithiophosphate (phosalone)
2-(diethoxyphosphinylimino)-4-methyl-2,3-dithiolane
O,O-dimethyl-S-[2-methoxy-1,3,4-thiadiazol-5-(4H)-onyl-(4)-methyl]dithiophosphate
Tris-(2-methyl-1-aziridinyl)-phosphine-oxide (METEPA)
O,O-dimethyl-S-phthalimidomethyl-dithiophosphate
S-(2-chloro-1-phthalimidoethyl)-O,O-diethyldithiophosphate
N-hydroxynaphthalimido-diethylphosphate
Dimethyl-3,5,6-trichloro-2-pyridylphosphate
O,O-dimethyl-O-(3,5,6-trichloro-2-pyridyl)thiophosphate
O,O-diethyl-O-(3,5,6-trichloro-2-pyridyl)thiophosphate
O,O-diethyl-O-2-pyrazinylthiophosphate (thionazin)
O,O-diethyl-O-(2-isopropyl-4-methyl-6-pyrimidyl)thiophosphate
O,O-diethyl-O-(2-quinoxylyl)thiophosphate
O,O-dimethyl-S-(4-oxo-1,2,3-benzotriazin-3(4H)-ylmethyl)dithiophosphate (azinphosmethyl)
O,O-diethyl-S-(4-oxo-1,2,3-benzotriazin-3(4H)-ylmethyl)dithiophosphate (azinphosethyl)
S-[(4,6-diamino-s-triazin-2-yl)methyl]-O,O-dimethyl-dithiophosphate (menazon)
S-[2-(ethylsulphonyl)ethyl]dimethylthiophosphate dioxydemeton-S-methyl)
Diethyl-S-[2-(ethylsulphinyl)ethyl]dithiophosphate oxydisulfoton)
Bis-O,O-diethylthiophosphoric acid anhydride (sulfotep)
Dimethyl-1,3-di(carbomethoxy)-1-propen-2-yl-phosphate
Dimethyl-(2,2,2-trichloro-1-butyroyloxyethyl)phosphonate (butonate)
O,O-dimethyl-O-(2,2-dichloro-1-methoxy-vinyl) phosphate
O,O-dimethyl-O-(3-chloro-4-nitrophenyl)thiophosphate (chlorthion)
O,O-dimethyl-O-(or S)-2-(ethylthioethyl)thiophosphate (demeton-S-methyl)
Bis-(dimethylamido)fluorophosphate (dimefox)
2-(O,O-dimethyl-phosphoryl-thiomethyl)-5-methoxy-pyrone-4
3,4-dichlorobenzyl-triphenylphosphonium chloride
Dimethyl-N-methoxymethylcarbamoylmethyl-dithiophosphate (formocarbam)
O,O-diethyl-O-(2,2-dichloro-1-chlorethoxyvinyl) phosphate
O,O-dimethyl-O-(2,2-dichloro-1-chlorethoxyvinyl) phosphate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorophenylthiomethyl)dithiophosphate (methylcarbophenothion)
O,O-dimethyl-S-(ethylthiomethyl)dithiophosphate Diisopropylaminofluorophosphate (mipafox)
O,O-dimethyl-S-(morpholinylcarbamoylmethyl)dithiophosphate (morphothion)
Bismethylamido-phenylphosphate
O,O-dimethyl-S-(benzenesulphonyl)dithiophosphate
O,O-dimethyl-(S and O)-ethylsulphinylethylthiophosphate
O,O-diethyl-O-4-nitrophenylphosphate
O,O-diethyl-S-(2,5-dichlorophenylthiomethyl)dithiophosphate (phendapton)
Triethoxy-isopropoxy-bis (thiophosphinyl)disulphide
O,O-diethyl-O-(4-methyl-coumarinyl-7)-thiophosphate (potasan)
2-methoxy-4H-1,3,2-benzodioxaphosphorine-2-oxide
Octamethylpyrophosphoramide (schradan)
Bis(dimethoxythiophosphinylsulphido)-phenylmethane
5-amino-bis(dimethylamido)phosphinyl-3-phenyl-1,2,4-triazole (triamiphos)
N-methyl-5-(O,O-dimethylthiolphosphoryl)-3-thiavaleramide (vamidothion) and
N,N,N',N'-tetramethyldiamidofluorophosphate (dimefox).

CHLORINATED HYDROCARBONS

γ-Hexachlorocyclohexane [Gammexane; lindane; γHCH]
1,2,4,5,6,7,8,8-octachloro-3α,4,7,7α'-tetrahydro-4,7-methyleneindane [chlordan]
1,4,5,6,7,8,8-heptachloro-3α,4,7,7α-tetrahydro-4,7-methyleneindane [heptachlor]
1,2,3,4,10,10-hexachloro-1,4,4α,5,8,8α-hexahydro-endo-1,4-exo-5,8-dimethanonaphthalene [aldrin]
1,2,3,4,10,10-hexachloro-6,7-epoxy-1,4,4a,5,6,7,8,8a-octahydro-exo-1,4-endo-5,8-dimethanonaphthalene [dieldrin]
1,2,3,4,10,10-hexachloro-6,7-epoxy-1,4,4a,5,6,7,8,8a-octahydro-endo,endo-5,8-dimethanonaphthalene [endrin]
6,7,8,9,10,10-hexachloro-1,5,5a,6,9,9a-hexahydro-6,9-methano-2,3,4 benzo[e]-dioxa-thiepene-3-oxide [endosulfan]
Chlorinated camphor [toxaphene]
Decachloroctahydro-1,3,4-metheno-2H-cyclobuta[e d]pentalen-2-one
Dodecachloroctahydro-1,3,4-metheno-1H-cyclobuta[c d]pentalene [mirex]
Ethyl-1,1a,3,3a,4,5,5,5a,5a,6-decachloroctahydro-2-hydroxy-1,3,4-metheno-1H-cyclobuta[c d]pentalene-2-laevulinate
Bis(pentachloro-2,4-cyclopentadien-1-yl)
Dinoctone-o
1,1,1-trichloro-2,2-bis(p-chlorophenyl)ethane [DDT]
Dichlorodiphenyl-dichloroethane [TDE]
Di(p-chlorophenyl)-trichloromethylcarbinol [dicofol]
Ethyl-4,4'-dichlorophenylglycollate [chlorobenzylate]
Ethyl-4,4'-dibromobenzylate [bromobenzylate]
Isopropyl-4,4'-dichlorobenzylate
1,1,1-trichloro-2,2 bis(p-methoxyphenyl)ethane [methoxychlor]
Diethyl-diphenyl-dichlorethane
Decachloropentacyclo(3,3,2,0$^{2,6}$,0$^{3,9}$,0$^{7,10}$)decan-4-one [chlordencon].

NITROPHENOLS AND DERIVATIVES 4,6-dinitro-6-methylphenol Na salt [dinitrocresol]
Dinitrobutylphenol-2,2',2''-triethanolamine salt
2-cyclohexyl-4,6-dinitrophenol [Dinex]
2-(1-methylheptyl)-4,6-dinitrophenyl-crotonate [dinocap]
2 sec.-butyl-4,6-dinitrophenyl-3-methyl-butenoate [binapacryl]
2 sec.-butyl-4,6-dinitrophenyl-cyclopropionate and
2 sec.-butyl-4,6-dinitrophenyl-isopropyl-carbonate [dinobuton].

VARIOUS SUBSTANCES

N-(2-methyl-4-chlorophenyl)-N'+N'-dimethyl-formamidin (Galecron)
Sabadilla
Rotenon
Cevadin
Veratridin
Ryania
Pyrethrin
3-allyl-2-methyl-4-oxo-2-cyclopenten-1-yl-chrysanthemumate (allethrin)
6-chloropiperonyl-chrysanthemumate (barthrin)
2,4-dimethylbenzyl-chrysanthemumate (dimethrin)
2,3,4,5-tetrahydrophthalimidomethyl-chrysanthemumate
(5-benzyl-3-furyl)-methyl-2,2-dimethyl-3-(2-methylpropanyl) cyclopropanecarboxylate
Nicotine
*Bacillus thuringiensis* Berliner
Dicyclohexylcarbodiimide
Azobenzene
4-chlorobenzyl-4-chlorophenylsulphide [chlorbensid]
Creosote oil
6-methyl-2-oxo-1,3-dithiolo-[4,5,-b]-quinoxaline [quinomethionate]
(I)-3-(2-furfuryl)-2-methyl-4-oxocyclopent-2-enyl(I)-(cis+trans)chrysanthemum-monocarboxylate [furethrin]
2-pivaloyl-indane-1,3-dione [pindone]
2-fluoroethyl(4-bisphenyl)acetate
2-fluoro-N-methyl-N(1-naphthyl)-acetamide
Pentachlorophenol and salts
2,2,2-trichloro-N-(pentachlorophenyl)-acetimidoyl chloride
N'-(4-chloro-2-methylphenyl)-N,N-dimethylformamidine (chlorphenamidine)
4-chlorobenzyl-4-fluorophenyl-sulphide (fluorobenside)
5,6-dichloro-1-phenoxycarbanyl-2-trifluoromethyl-benzimidazole (fenozaflor)
Tricyclohexyl-tin hydroxide
2-thiocyanatoethyl-lauric acid ester
β-Butoxy-β'-thiocyanatodiethyl-ether
Isobornyl-thiocyanatocetate
p-Chlorophenyl-p-chlorobenzenesulphonate (ovex)
2,4-dichlorophenyl benzenesulphonate
p-Chlorophenyl-benzenesulphonate (fenson)
p-Chlorophenyl-2,4,5-trichlorophenylsulphone (tetradifon)
p-Chlorophenyl-2,4,5-trichlorophenylsulphide (tetrasul)
Methyl bromide
p-Chlorophenyl-phenylsulphone
p-Chlorobenzyl-p-chlorophenylsulphide (chlorobenside)
4-chlorophenyl-2,4,5-trichlorophenylazosulphide
2(p-tert.-butylphenoxy-1-methylethyl-2-chlorethyl-sulphite
2(p-tert.-butylphenoxy)cyclohexyl-2-propinyl-sulphite
4,4'-dichloro-N-methylbenzenesulphonanilide
N-(2-fluoro-1,1,2,2-tetrachlorethylthio)-methanesulphonanilide
2-thio-1,3-dithiolo-(4,5-6)quinoxaline (thioquinox)
Chloromethyl-p-chlorophenylsulphone (lauseto new)
1,3,6,8-tetranitrocarbozole and
Prop-2-ynyl-(4-t-butylphenoxy)-cyclohexylsulphite (propargil).

The ratio of the propargyl compound of the Formula I to the insecticidal and/or acaricidal compound in the composition preferably varies between 1:1000 and 200:1.

The synergistically active compositions can be used against all harmful insects, for example against aphids, such as the green peach aphid (*Mycus persicae*), the bean aphid (*Doralis fabae*); scale insects such as *Aspidiotus hederae*, *Lecanium hesperidium* and *Pseudococcus maritimus*; Thysanoptera such as *Hercinothrips femoralis*, and bugs such as the beet bug (*Piesma quadrata*) or the bed bug (*Cimex lectularius*), caterpillars, such as *Plutella*

*maculipennis* and *Lymantria dispar*; beetles such as granary weevils (*Calandra granaria*) or Colorado beetles (*Leptinotarsa decemileata*), and also varieties which live in the soil, such as wireworms (Agriotes sp.) or cockchafer grubs (*Melolontha melolontha*); cockroaches, such as the German cockroach (*Battella germanica*); Orthoptera, such as the cricket (*Gryllus domesticus*); termites, such as Beticulitermes; Hymenoptera, such as ants; Diptera, such as the vinegar fly (*Drosophila melanogaster*), the Mediterranean fruit fly (*Ceratitis capitata*), the housefly (*Musca domestica*), and mosquitoes such as the yellow fever mosquito (*Aëdes aegypti*).

The compositions according to the present invention are also especially effective when combating representatives of the order Acarina, for example, Eulaelaps, Echinolaelaps, Laelaps, Haemogamesus, Dermanyssus, Ornithonyssus, Allodermanyssus, especially *Allodermanyssus sanguieues*, Pneumonyssus, Amblyomma, Aponomma, Boophilus, Dermacentor, Haemophysalis, Hyalomma, Ixodes, Margaropus, Rhipicephalus, Ornithodorus; Otobius, Cheyletidae, for example Cheyletus, Psorergates, Demodicidae, Trombiculidae, for example Trombicula, Euthrombicula, Schöngastia, Acomatacurus, Neoschöngastia, Euschöngastia, Sarcoptiformes for example Notoedres, Sarcoptes, Knemidokoptes, Psoroptidae, for example Psoroptes, Chorioptes, Otodectes or Tetranychidae, for example *Tetranychus telarius* and *Tetranychus urticae*.

These synergistic agent/biocidal compound mixtures can be used either by themselves or together with suitable carriers and/or other additives. Suitable carriers and additives can be solid and liquid and correspond to the substances which are customary in formulation technology, for example, natural or regenerated mineral substances, solvents, diluents, dispersing agents, emulsifiers, wetting agents, adhesives, thickeners, binders or fertilisers. Further, biocidal compounds can also be added. Such biocidal compounds can, for example, belong to the class of the ureas, the saturated or unsaturated halogen-fatty acids, halogenobenzonitriles, halogenobenzoic acids, phenoxyalkyl-carboxylic acids, triazines, nitroalkylphenols, organic phosphoric acid compounds, quaternary ammonium salts, sulphamic acids, arsenates, arsenites, borates or chlorates.

The compositions can be used in the form of solutions, emulsions, suspensions, granules or dusting agents. The forms of application depend on the end uses and must ensure that the active substances can be finely distributed.

The content of active substances combination in the above mentioned compositions is between 0.1 and 95%, in which connection it should be mentioned that in the case of application from aircraft or by means of other suitable forms of application, concentrations of up to 99.5% or even pure active substance combinations may be employed.

To manufacture solutions it is possible to use solvents, such as especially alcohols, for example ethyl alcohol or isopropyl alcohol, ketones, such as acetone or cyclohexanone, aliphatic hydrocarbons, such as kerosene, and cyclic hydrocarbons, such as benzene, toluene, xylene, tetrahydronaphthalene, alkylated naphthalenes, chlorinated hydrocarbons, such as tetrachlorethane and ethylene chloride, and mineral and vegetable oils or mixtures of the above mentioned substances.

Aqueous preparations are preferably emulsions and dispersions. The active substance combination, by itself or in one of the above mentioned solvents, is homogenised in water, preferably by means of wetting agents or dispersing agents. Quaternary ammonium compounds may be mentioned as examples of cationic emulsifiers or dispersing agents; soaps, aliphatic long-chain sulphuric acid monoesters, aliphatic-aromatic sulphonic acids and long-chain alkoxyacetic acids may be mentioned as examples of anionic agents; any polyglycol ethers of fatty alcohols or ethylene oxide condensation products with p-tert. alkylphenols may be mentioned amongst non-ionic agents. On the other hand, it is also possible to manufacture concentrates consisting of the active substance, emulsifier or dispersing agent and optionally solvents. Such concentrates can be diluted before use, for example, with water.

Dusting agents can, firstly, be manufactured by mixing or conjoint grinding of the active substance combination with a solid carrier. Possible solid carriers are, for example: talc, diatomaceous earth, kaolin, bentonite, calcium carbonate, boric acid and tricalcium phosphate, wood flour, cork powder, charcoal and other materials of vegetable origin. Alternatively, the substances can be absorbed on the carriers, using a volatile solvent. Pulverulent preparations and pastes can be made capable of suspension in water, and used as spraying agents, by adding wetting agents and protective colloids.

In many cases the use of granules for gradual release of the active substance combination over a prolonged period of time is of advantage. These can be manufactured by dissolving the active substances in an organic solvent, absorbing this solution by a granular material, for example attapulgite or $SiO_2$, and removing the solvent. They can also be manufactured by mixing the active substance combination with polymerisable compounds, after which polymerisation is carried out which leaves the active substances unaffected, the granulation being carried out whilst the polymerisation is still proceeding.

The following examples illustrate the invention.

EXAMPLE 1

(a) Manufacture of 2,4,5-trichlorophenyl-propargyl-ether by reaction of 2,4,5-trichlorophenol with propargyl bromide 29.2 g. of 2,4,5-trichlorophenol, 19.6 g. of propargyl bromide, 22.8 g. of potassium carbonate and 150 ml. of dry acetone were stirred for 16 hours under reflux. After cooling, the reaction mixture was filtered. The solid constituent was rinsed with acetone and the filtrate was rendered slightly acid by means of glacial acetic acid.

Thereafter, the solvent was evaporated in vacuo and at a temperature of 40° C. The residue, of the formula

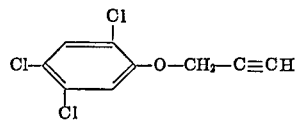

(Active substance No. 1)

was twice recrystallised from alcohol. Melting point 60–61° C.

(b) Manufacture of 2-nitrophenyl-propargyl-ether by reaction of 1-chloro-2-nitrobenzene with propargyl alcohol 22 g. of powdered sodium hydroxide and 33 g. of propargyl alcohol were initially introduced into 300 ml. of dimethylsulphoxide in a stirred flask. 80 g. of 1-chloro-2-nitro-benzoic acid were added dropwise with good stirring and external cooling in such a way that the temperature does not exceed 20° C. The reaction mixture was stirred for 3 days at 20° C. and thereafter poured into ice water. The oil which had separated out was separated off, and the aqueous phase was extracted with ether. The oil and the ether extract were combined and the solvent was distilled off.

The residue, of the formula

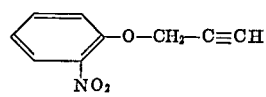

(Active substance No. 2)

was twice recrystallised from alcohol and has a melting point of 75–76° C.

The following compounds were manufactured analogously.

R—O—CH₂—C≡CX

| Active substance No. | X | R | Melting point/boiling point, ° C. |
|---|---|---|---|
| 3 | H | Cl—C₆H₃(CH₃)— (4-Cl, 2-CH₃ phenyl) | 76/0.2 mm. Hg. 74/0.16 mm. Hg. |
| 4 | H | Cl—C₆H₃(NO₂)— (4-Cl, 2-NO₂ phenyl) | 83.5–84.5. |
| 5 | H | Br—C₆H₃Cl₂— (4-Br, 2,5-diCl phenyl) | 68–69. |
| 6 | H | I—C₆H₃Cl₂— (4-I, 2,5-diCl phenyl) | 77–78. |
| 7 | H | 2,6-diBr-phenyl | 57–58. |
| 8 | H | O₂N—C₆H₃(CH₃)— | 63–64. |
| 9 | H | O₂N—C₆H₂Br₂— (4-NO₂, 2,6-diBr phenyl) | 118–120. |
| 10 | I | Cl—C₆H₃(I)Cl— (2,5-diCl, 4-I phenyl) | 146–147. |
| 11 | I | Br—C₆H₂Cl₂— (4-Br, 2,5-diCl phenyl) | 119–121. |
| 12 | I | O₂N—C₆H₃(CH₃)— | 146–147. |
| 13 | I | Cl—C₆H₃Cl₂— (2,4,5-triCl phenyl) | 108–109. |
| 14 | I | 2,6-diBr-phenyl | 77–79. |
| 15 | I | O₂N—C₆H₂Br₂— | 114–116. |
| 16 | H | Cl—C₆H₃Cl— (3,4-diCl phenyl) | 80/0.11 mm. Hg. |
| 17 | H | 2,4-diCl phenyl | 80/0.18 mm. Hg. |
| 18 | H | 3,4-diCl phenyl | 48–50. |
| 19 | H | Cl—C₆H₂(NO₂)Cl— (2,5-diCl, 4-NO₂ phenyl) | 83–84. |
| 20 | H | 3-COCH₃-phenyl | 93/0.07 mm. Hg. |
| 21 | H | CH₃OC—C₆H₄— (4-CH₃OC phenyl) | 78. |
| 22 | H | 4-Cl phenyl | 108/12 mm. Hg. |
| 23 | H | 3-CH₃ phenyl | 68. |
| 24 | H | 4-Cl phenyl | 111/12 mm. Hg. |
| 25 | H | Br—C₆H₄— | 67/0.07 mm. Hg. |
| 26 | H | NC—C₆H₂I₂— (2,5-diI, 4-NC phenyl) | 182. |
| 27 | H | Cl—C₆H₂(CH₃)Cl— (2,5-diCl, 4-CH₃ phenyl) | 77–78. |
| 28 | H | H₃CO—C₆H₄— | 72/0.075 mm. Hg. |
| 29 | I | Cl—C₆H₂(NO₂)Cl— | 103. |
| 30 | I | Cl—C₆H₃(CH₃)— | 42–43. |
| 31 | I | 3,4-diCl phenyl | 52. |
| 32 | I | 2,4-diCl phenyl | 91–92. |
| 33 | I | 3,4-diCl phenyl | 94. |

TABLE—Continued

| Active substance No. | X | R | Melting point/boiling point, °C. |
|---|---|---|---|
| 34 | H | Cl,Cl,Cl,Cl,Cl-phenyl (pentachlorophenyl) | 140–141. |
| 35 | H | CH₃-, NO₂-phenyl | 55–56. |
| 36 | I | Cl-phenyl | 53. |
| 37 | I | Cl-phenyl (meta) | 86/0.078 mm. Hg. |
| 38 | I | Br-phenyl | 73. |
| 39 | I | NO₂-, CH₃-phenyl | 124. |
| 40 | I | CH₃O-phenyl | 45–46. |
| 41 | I | Cl,Cl,CH₃-phenyl | 91–92. |
| 42 | I | N≡C-, I, I-phenyl | 175. |
| 43 | H | O₂N-, Cl, Cl-phenyl | 98–99. |
| 44 | H | O₂N-phenyl | 115–116. |
| 45 | H | O₂N-, NO₂-phenyl | 101–102. |
| 46 | I | CH₃-, NO₂-phenyl | 110–111. |
| 47 | H | Cl-, CH₃-phenyl | 74/0.13 mm. Hg. |
| 48 | H | O₂N-, Cl-phenyl | 105–106. |
| 49 | I | O₂N-, Cl-phenyl | 161. |
| 50 | H | H₃C-, Cl-, Cl-phenyl | 65–67. |
| 51 | H | Cl-, Cl-phenyl | 63/0.04 mm. Hg. |
| 52 | H | CH₃-, CH(CH₃)₂-phenyl | 68–77/0.06 mm. Hg. |
| 53 | H | phenyl | 75/10 mm. Hg. |
| 54 | H | CH₃-phenyl | 89–95/11 mm. Hg. |
| 55 | I | Cl-, CH₃-phenyl | 61–62. |
| 56 | I | CH₃-, Cl-, Cl-phenyl | 77–79. |
| 57 | I | CH₃-phenyl | Oil. |
| 58 | I | NO₂-phenyl (ortho) | 101–101. |
| 59 | I | Cl-, NO₂-phenyl | 117. |
| 60 | H | Br-, Br-phenyl | 69–70. |
| 61 | H | Cl-, Cl, Cl-phenyl | 100–101. |
| 62 | H | Cl, Cl-phenyl | 48–49. |
| 63 | I | Cl, Cl-phenyl | 58–59. |
| 64 | I | Cl-, Cl, Cl-phenyl | 102–103. |
| 65 | H | Cl, Cl-phenyl | 46. |
| 66 | I | Cl-, Cl-phenyl | 65–66. |

| Active substance No. | X | R | Melting point/boiling point, ° C. |
|---|---|---|---|
| 67 | I | phenyl-NO₂ | 88–89. |
| 68 | H | phenyl-NO₂ | 69–70. |
| 69 | H | phenyl-Cl | 65/0.02 mm. Hg. |
| 70 | I | Br-phenyl-Br | 113–114. |

R—S—CH₂—C≡C—X

| 71 | H | (CH₃)₃C-phenyl- | 87/0.07 mm. Hg. |
| 72 | H | Cl-phenyl- | 76/0.065 mm. Hg. |
| 73 | H | CH₃-phenyl- | 65–67/0.075 mm. Hg. |
| 74 | H | (CH₃)₃C-phenyl-CH₃ | 114/0.09 mm. Hg. |

EXAMPLE 2

(a) Dusting agents

Equal parts of an active substance according to the invention and of precipitated silica were finely ground. Dusting agents, preferably containing 1–6% of active substance, could be prepared therefrom by mixing with kaolin or talc.

(b) Spraying powders

To manufacture a spraying powder, the following components, for example, were mixed and finely ground:

50 parts of active substance according to the present invention
20 parts of highly adsorbent silica
25 parts of bolus alba (kaolin)
1.5 parts of sodium 1-benzyl-2-stearyl-benzimidazole-6,3'-disulphonate and
3.5 parts of a reaction product of p-tert. octylphenol and ethylene oxide.

(c) Emulsion concentrate

It was also possible to formulate easily soluble active substances as an emulsion concentrate in accordance with the following instruction: 20 parts of active substance, 70 parts of xylene, and 10 parts of a mixture of a reaction product of an alkylphenol with ethylene oxide and calcium dodecylbenzenesulphonate were mixed. On dilution with water to the desired concentration, a sprayable emulsion was produced.

(d) Granules 7.5 g. of one of the active substances of Formula I were dissolved in 100 ml. of acetone and the acetone solution thus obtained was added to 92 g. of granular attapulgite (mesh size: 24/48 meshes/inch). The whole was well mixed and the solvent was stripped off in a rotary evaporator. Granules containing 7.5% of active substance were obtained.

EXAMPLE 3

Test for synergistic action

Female houseflies aged 2 to 5 days were used for this test. Before beginning the experiment, the flies were sorted as to gender under $CO_2$ narcosis and the females were collected in groups of 10. The flies, which were kept motionless by means of $CO_2$, were treated with a dispenser which on pressing the button each time releases 1 microlitre of the test substance dissolved in acetone. After the treatment, the flies, in groups of 10, were placed in Petri dishes into which a cottonwool pad soaked with money water had been introduced for feeding purposes. After 24 hours, the experiment was evaluated by counting the flies which could no longer move.

The results quoted in the table represent average values of the percentage mortality from four repeat experiments. The test was carried out with the following amounts per fly [weight of one fly 20 mg. (average value)].

(a) 0.14γ of the phosphate of the formula:

$$CH_3-O \diagdown P(=O) / O-C(Cl)=C(CH_3)-CO-N(C_2H_5)_2 \quad (A)$$

(b) 0.14γ of (A) and 0.14γ of one of the active substances Nos. 1, 2 and 4.

TABLE I

| | Dose in γ/ ♀ Musca domestica | Percent mortality |
|---|---|---|
| (A) | 0.14 | 18±8 |
| Compound No. 1 plus (A) | 0.14+0.14 | 96±5 |
| (A) | 0.14 | 18±8 |
| Compound No. 2 plus (A) | 0.14+0.14 | 98±2 |
| (A) | 0.14 | 18±8 |
| Compound No. 4 plus (A) | 0.14+0.14 | 97±2 |

EXAMPLE 4

Test of the synergistic action, against spider mites, of active substance No. 3 on a compound of the formula Cl-phenyl(CH₃)-N=CH-N(CH₃)₂

Bush bean plants (*Phaseolus vulgaris*) in the two-leaf stage were infected with spider mites, 12 hours before the treatment with the active substance, by placing infested pieces of leaf from a culture on them, so that after the end of this time a population in all stages of development is present on the plant. The plants were then sprayed, using a chromatography atomiser, with the emulsified active substance of the formula Cl-phenyl(CH₃)-N=CH-N(CH₃)₂ or a mixture of this compound with active substance No. 3, until a uniform deposit of droplets was produced on the leaf surface.

The results were evaluated after 2 and 7 days: the parts of the plant were inspected under a stereo-microscope in order to calculate the percentage mortalities.

The table which follows give the percentage mortalities of the normally sensitive variety *Tetranychus urticae* Koch and the percentage mortalities of the phosphoric acid ester-tolerant variety *Tetranychus telarius* L.

| Compound | Concentration, p.p.m. | Tetranychus urticae mortality, percent | | Tetranychus telarius mortality, percent | |
|---|---|---|---|---|---|
| | | Adults 2 days | Adults 7 days | Adults 2 days | Adults 7 days |
| 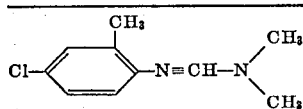 | 200 | 40 | 70 | 20 | 50 |
| | 100 | 20 | 60 | 20 | 30 |
| | 50 | 20 | 40 | 0 | 20 |
| | 25 | 0 | 10 | 0 | 20 |
| 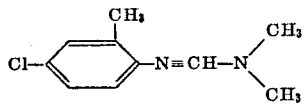 | 100 plus 100* | 70 | 80 | 50 | 70 |
| | 50 plus 50* | 50 | 60 | 40 | 60 |
| | 25 plus 25* | 40 | 50 | 30 | 40 |
| | 12.5 plus 12.5* | 40 | 30 | 20 | 20 |

*Active substance No. 3.

EXAMPLE 5

The test of the synergistic action of the compounds 1, 2 and 4 on the compounds of the formulae

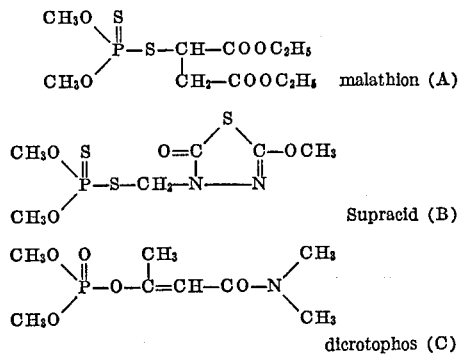

and synthetic pyrethrine from Sumitomo, SP1103 (D) was carried out analogously to Example 3.

The results listed in the table represent average values of the percentage mortality of female houseflies, from two repeat experiments.

```
0.1γ Compound 1 ------------------------------- 0
0.1γ (A) --------------------------------------- 38
0.1γ Compound 1+ 0.1γ (A) --------------------- 76

0.1γ Compound 1 ------------------------------- 0
0.1γ (C) --------------------------------------- 6
0.1γ Compound 1+0.1γ (C) ---------------------- 40

0.07γ Compound 1 ------------------------------ 0
0.07γ (D) -------------------------------------- 13
0.07γ Compound 1+0.07γ (D) -------------------- 42

0.6γ Compound 2 ------------------------------- 0
0.6γ (A) --------------------------------------- 38
0.6γ Compound 2+0.6γ (A) ---------------------- 91

0.05γ Compound 2 ------------------------------ 0
0.05γ (B) -------------------------------------- 1
0.05γ Compound 2+0.05γ (B) -------------------- 33

0.1γ Compound 2 ------------------------------- 0
0.1γ (C) --------------------------------------- 6
0.1γ Compound 2+0.1γ (C) ---------------------- 55

0.07γ Compound 2 ------------------------------ 0
0.07γ (D) -------------------------------------- 13
0.07γ Compound 2+ 0.07γ (D) ------------------- 50

0.6γ Compound 4 ------------------------------- 0
0.6γ (A) --------------------------------------- 38
0.6γ Compound 4+ 0.6γ (A) --------------------- 92

0.05γ Compound 4 ------------------------------ 0
0.05γ (B) -------------------------------------- 1
0.05γ Compound 4+0.05γ (B) -------------------- 31

0.07γ Compound 4 ------------------------------ 0
0.07γ (D) -------------------------------------- 13
0.07γ Compound 4+0.07γ (D) -------------------- 50
```

What is claimed is:

1. An insecticidal composition consisting essentially of equal parts by weight of O,O-dimethyl-S-(1,2-dicarbethoxyethyl)-dithiophosphate and 2,4,5 - trichlorophenylpropargyl ether.

2. An insecticidal composition consisting essentially of equal parts by weight of 3-dimethoxyphosphinyloxy-N,N-dimethyl-cis-crotonamide and 2,4,5 - trichlorophenylpropargyl ether.

3. An insecticidal composition consisting essentially of equal parts by weight of O,O-dimethyl-S-1,2-(dicarbethoxyethyl)-dithiophosphate and 2 - nitrophenylpropargyl ether.

4. An insecticidal composition consisting essentially of equal parts by weight of O,O-dimethyl-S-[2-methoxy-1,3,4-thiadiazol - 5(4H) - onyl - (4) - methyl]-dithiophosphate and 2-nitrophenylpropargyl ether.

5. An insecticidal composition consisting essentially of equal parts by weight of 3-(dimethoxyphosphinyloxy)-N,N-dimethyl-cis-crotonamide and 2 - nitrophenylpropargyl ether.

6. An insecticidal composition consisting essentially of equal parts by weight of O,O-dimethyl-S-(1,2-dicarbethoxyethyl)-dithiophosphate and 2-nitro - 4 - chlorophenylpropargyl ether.

7. An insecticidal composition consisting essentially of equal parts by weight of O,O-dimethyl-S-[2-methoxy-1,3,4-thiadiazol - 5(4H) - onyl - (4) - methyl]-dithiophosphate and 2-nitro-4-chlorophenylpropargyl ether.

8. A method for combatting insects and members of the order acarina which comprises applying thereto an insecticidally and acaracidally effective amount-of a composition comprising, as active ingredients, equal parts by weight of O,O-dimethyl-S-(1,2-dicarbethoxyethyl)-dithiophosphate and 2,4,5-trichlorophenylpropargyl ether.

9. A method for combatting insects and members of the order acarina which comprises applying thereto an insecticidally and acaracidally effective amount of a composition comprising, as active ingredients, equal parts by weight of 3 - dimethoxyphosphinyloxy-N,N-dimethyl-cis-crotonamide and 2,4,5-trichlorophenylpropargyl ether.

10. A method for combatting insects and members of the order acarina which comprises applying thereto an insecticidally and acaracidally effective amount of a composition comprising, as active ingredients, equal parts by weight of O,O-dimethyl-S-(1,2-dicarbethoxyethyl)-dithiophosphate and 2-nitrophenylpropargyl ether.

11. A method for combatting insects and members of the order acarina which comprises applying thereto an insecticidally and acaracidally effective amount of a composition comprising, as active ingredients, equal parts by weight of 2-(dimethoxyphosphinyloxy)-N,N-dimethyl-cis-crotonamide and 2-nitrophenylpropargyl ether.

12. A method for combatting insects and members of the order acarina which comprises applying thereto an insecticidally and acaracidally effective amount of a composition comprising, as active ingredients, equal parts by weight of O,O-dimethyl-S-(1,2-dicarbethoxyethyl)-dithiophosphate and 2-nitro-4-chlorophenylpropargyl ether.

13. A method for combatting insects and members of the order acarina which comprises applying thereto an insecticidally and acaracidally effective amount of a composition comprising, as active ingredients, equal parts by weight of O,O-dimethyl-S-[2-methoxy-1,3,4-thiadiazol-5(4H)-onyl-(4)-methyl]-dithiophosphate and 2-nitro-4-chlorophenylpropargyl ether.

References Cited

UNITED STATES PATENTS

| | | | |
|---|---|---|---|
| 3,119,737 | 1/1964 | Strickler et al. | 424—340 |
| 3,147,181 | 9/1964 | Hopkins et al. | 424—340 X |
| 3,362,871 | 1/1968 | Fellig et al. | 424—340 X |
| 3,375,157 | 3/1968 | Williams | 424—340 |
| 3,489,805 | 1/1970 | O'Brien et al. | 424—340 X |

FOREIGN PATENTS

| | | | |
|---|---|---|---|
| 19,517 | 1966 | Japan | 424—340 |
| 629,317 | 1963 | Belgium. | |

OTHER REFERENCES

The Merck Index of Chemicals and Drugs, 7th ed., pp. 875–76, Merck & Co., Inc., Rahway, N.J., 1960.

Chemical Week, pp. 45, 46, 48, 54, Apr. 12 and 26, 1969.

ALBERT T. MEYERS, Primary Examiner

D. W. ROBINSON, Assistant Examiner

U.S. Cl. X.R.

424—211, 213, 447, 340